United States Patent
Amerio et al.

(10) Patent No.: US 12,296,699 B2
(45) Date of Patent: May 13, 2025

(54) CHARGING SOCKET PROVIDED WITH A DUAL-FUNCTIONAL FEATURE FOR DRAINAGE AND FIXING FUNCTIONS

(71) Applicant: TE Connectivity Italia Distribution S.r.l., Turin (IT)

(72) Inventors: Fulvio Amerio, Turin (IT); Demis Spincich, Turin (IT); Arianna Spolverato, Turin (IT)

(73) Assignee: TE Connectivity Italia Distribution S.r.l., Turin (IT)

(*) Notice: Subject to any disclaimer, the term of this patent is extended or adjusted under 35 U.S.C. 154(b) by 482 days.

(21) Appl. No.: 17/864,530

(22) Filed: Jul. 14, 2022

(65) Prior Publication Data
US 2023/0015385 A1    Jan. 19, 2023

(30) Foreign Application Priority Data

Jul. 15, 2021   (IT) .................. 102021000018752

(51) Int. Cl.
| | | |
|---|---|---|
| *B60L 53/00* | (2019.01) | |
| *B60L 53/16* | (2019.01) | |
| *H01R 13/52* | (2006.01) | |
| *H01R 13/639* | (2006.01) | |

(52) U.S. Cl.
CPC .......... *B60L 53/16* (2019.02); *H01R 13/5227* (2013.01); *H01R 13/6397* (2013.01); *H01R 2201/26* (2013.01)

(58) Field of Classification Search
CPC . B60L 53/16; H01R 13/5227; H01R 13/6397; H01R 2201/26
See application file for complete search history.

(56) References Cited

U.S. PATENT DOCUMENTS

| | | | | |
|---|---|---|---|---|
| 5,257,949 A | * | 11/1993 | Paulus .............. | H01R 13/7197 439/607.05 |
| 5,362,258 A | * | 11/1994 | Arnswald .......... | H01R 13/746 439/271 |
| 6,386,913 B1 | * | 5/2002 | Mohammad ......... | H01R 24/50 439/579 |

(Continued)

FOREIGN PATENT DOCUMENTS

| | | |
|---|---|---|
| CN | 207098132 U | 3/2018 |
| CN | 212676521 U | 3/2021 |

(Continued)

OTHER PUBLICATIONS

Italian Search Report, Application No. 102021000018752, Dated: Apr. 5, 2022, 16 pages.

(Continued)

*Primary Examiner* — Phuong Chi Thi Nguyen
(74) *Attorney, Agent, or Firm* — Barley Snyder

(57) ABSTRACT

A charging socket includes a housing formed of an electrically insulating material, a cavity in the housing receiving an electrical contact, and a dual-functional element partially protruding from an outer surface of the housing. The dual-functional element has a fixing component and a drainage component. The fixing component protrudes from the housing and fixes the housing to a mounting bracket. The drainage component has a drainage channel within the housing discharging fluids from the charging socket.

16 Claims, 3 Drawing Sheets

(56) References Cited

U.S. PATENT DOCUMENTS

| | | | |
|---|---|---|---|
| 6,716,063 B1* | 4/2004 | Bryant | H01R 13/5208 439/589 |
| 7,182,651 B2* | 2/2007 | Waters | H01R 29/00 439/681 |
| 9,614,304 B2* | 4/2017 | Melni | H01R 11/11 |
| 2011/0281447 A1 | 11/2011 | Kano et al. | |
| 2012/0258617 A1 | 10/2012 | Osawa | |

FOREIGN PATENT DOCUMENTS

| | | |
|---|---|---|
| DE | 102013213336 A1 | 8/2018 |
| JP | 2019160809 A | 9/2019 |
| WO | 2015004053 A1 | 1/2015 |
| WO | 2018091422 A1 | 5/2018 |
| WO | 2018092646 A1 | 5/2018 |

OTHER PUBLICATIONS

Search Report from the European Patent Office dated Nov. 30, 2022, corresponding to Application No. 22184894.8-1201, 8 pages.
Examination Report from the Intellectual Property Office of India dated Feb. 8, 2023, corresponding to Application No. 202244039974, 5 pages.

* cited by examiner

US 12,296,699 B2

CHARGING SOCKET PROVIDED WITH A DUAL-FUNCTIONAL FEATURE FOR DRAINAGE AND FIXING FUNCTIONS

CROSS-REFERENCE TO RELATED APPLICATIONS

This application claims the benefit of the filing date under 35 U.S.C. § 119(a)-(d) of Italian Patent Application No. 102021000018752, filed on Jul. 15, 2021.

FIELD OF THE INVENTION

The present invention relates to a charging socket and, more particularly, to a charging socket having a draining device discharging water that has entered the charging socket and a fixing device fixing it to a mounting bracket.

BACKGROUND

It is known to provide charging sockets for hybrid or electric vehicles with a drainage element for discharging fluids from the contact chambers and with a fixing element for fixing them to mating components, such as a mating bracket. In fact, charging sockets for hybrid or electric vehicles typically operate with high voltages and, since the contact with water spray and moisture cannot be avoided in principle, it is necessary to provide them with drainage elements for discharging water that has entered the charging socket. Moreover, it may be necessary to assemble the charging sockets with mating brackets for protecting them against the external environment.

Document WO 2015/004053 A1, which is a patent application from the same Applicant, describes for instance a charging socket comprising contact chambers, wherein each of the contact chambers have a drainage opening, through which fluids (gas or liquids) which have entered the contact chamber can be discharged. Each of the drainage openings opens into a corresponding drainage element, which leads into the discharge connection pieces that can lead the fluid, for example, to a hose. The drainage element typically requires a protective cap to prevent foreign objects to enter them. Moreover, in order to protect the power contact elements, the charging socket may have a mating cover.

Further examples of charging sockets provided with fixing portions and drainage pipes forming distinct elements are disclosed in documents JP 2019 160809 A, WO 2018091422 A1 and WO 2018/092646 A1.

In the charging sockets known at the state of the art, the fixing elements and the drainage elements are made as distinct components and they have large dimensions and require a large amount of plastic to be produced, thus having a high impact on the environment. Moreover, they are difficult to mold and require complex tools to produce.

SUMMARY

A charging socket includes a housing formed of an electrically insulating material, a cavity in the housing receiving an electrical contact, and a dual-functional element partially protruding from an outer surface of the housing. The dual-functional element has a fixing component and a drainage component. The fixing component protrudes from the housing and fixes the housing to a mounting bracket. The drainage component has a drainage channel within the housing discharging fluids from the charging socket.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
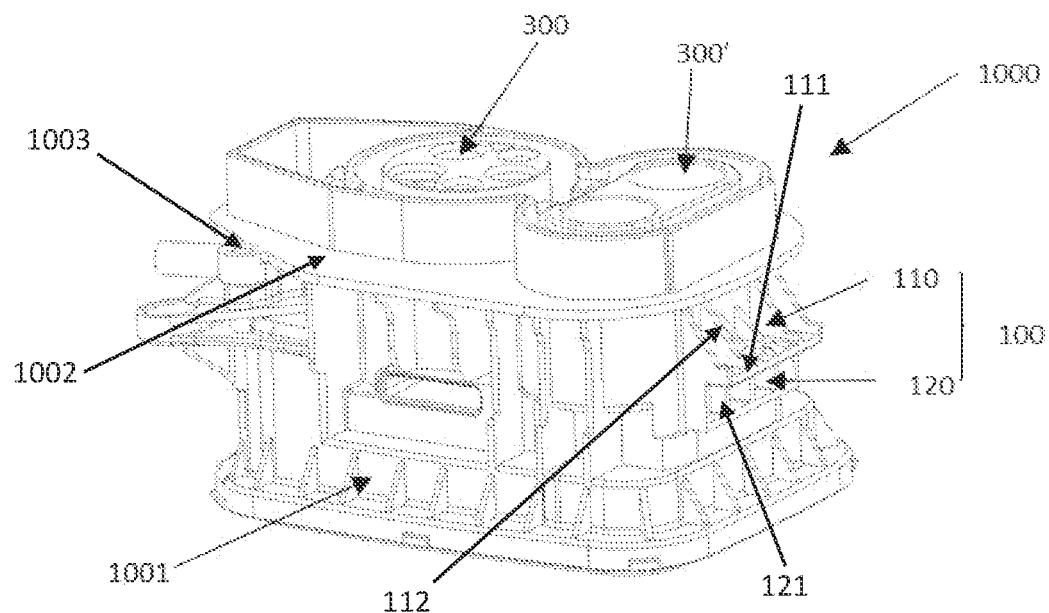
FIG. 1 is a perspective view of a charging socket according to an embodiment.

In the following, the present invention is described with reference to particular embodiments as shown in the drawings. Nevertheless, the present invention is not limited to the particular embodiments described in the following detailed description and shown in the figures, but, instead, the embodiments described simply exemplify several aspects of the present invention, the scope of which is defined by the appended claims.

Further modifications and variations of the present invention will be clear for the person skilled in the art. Therefore, the present description must be considered as including all the modifications and/or variations of the present invention, the scope of which is defined by the appended claims.

For simplicity, identical or corresponding components are indicated in the figures with the same reference numbers.

FIG. 1 schematically illustrates a perspective view of a charging socket 1000, for example for a hybrid or electric vehicle, according to an embodiment of the present invention.

The structure of a charging socket according to an embodiment of the present invention is briefly outlined in the following paragraphs and is described in more details for example in document WO 2015/004053 A1, whose content is entirely incorporated herewith by reference. In particular, the internal structure of the housing 102, of the contact chambers 108 provided with contact elements 112 and of the drainage channels 132a-e of the charging socket 100 described in WO 2015/00453 A1 can be adopted also for the present invention. For example, the structure of the contact chambers 108 described in WO 2015/00453 A1 can be adopted also for the cavities 300, 300' of the present invention and the structure of the drainage channels 132a-e described in WO 2015/00453 A1 can be adopted also for the drainage channels 121 of the present invention.

The charging socket 1000 according to an embodiment of the present invention comprises a housing 1001, which can be produced from an electrically insulating plastic material using injection-molding technology. The housing 1001 has an assembly plate 1002, from which the actual insertion socket partially protrudes. The charging socket 1000 comprises a plurality of cavities 300, 300' for receiving electrical contacts: in particular, in FIG. 1, five cavities 300 for receiving AC contacts and two cavities 300' for receiving DC contacts are illustrated. However, it must be understood that any number of AC and/or DC electrical contacts may be formed in the charging inlet 1000.

Figure 4:
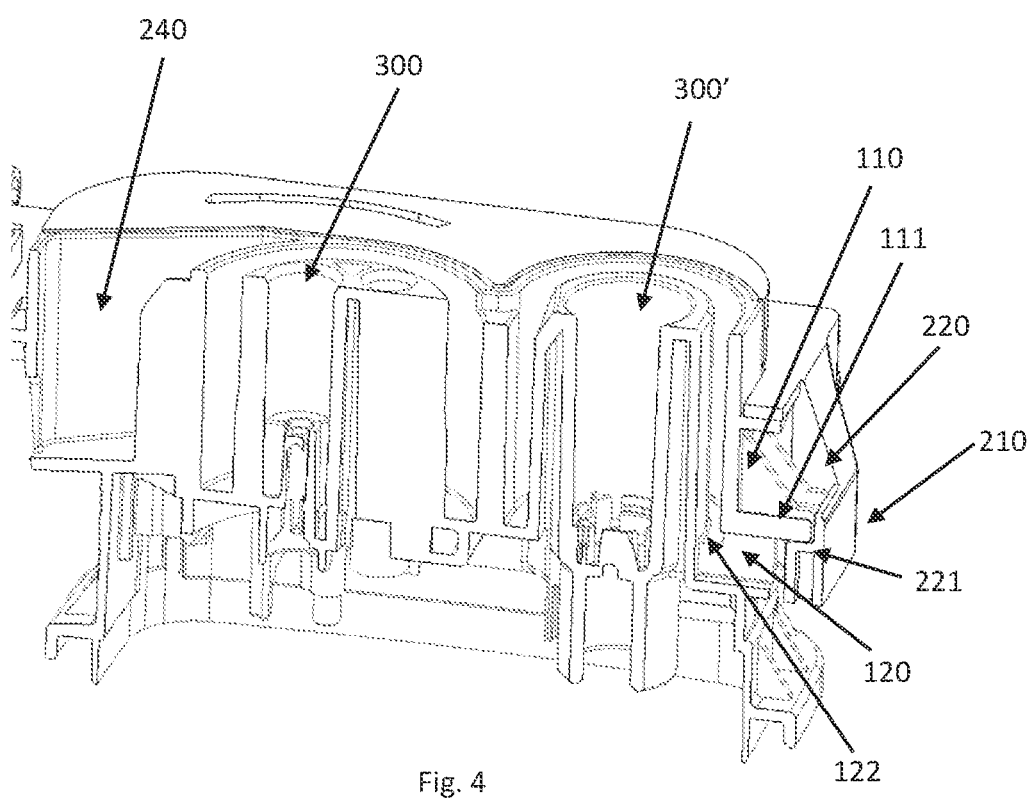
FIG. 4 is a sectional perspective view of the charging socket with the bracket.

Each of the cavities 300, 300' of the charging socket 1000 has a drainage opening 122 (visible in the sectional view of the charging socket 1000 of FIG. 4), through which fluids, such as gas or liquids, which have entered the contact chamber can be discharged. In the charging socket 1000 according to an embodiment of the invention, each drainage opening 122 opens into a corresponding drainage channel 121, which is produced from the housing material. Each drainage channel 121 is closed along all sides and is constructed separately for each cavities 300, 300'.

For illustrative and not limiting purposes, four drainage channels 121 are illustrated in FIG. 1. However, it is clear that any number of drainage channels 121 may be formed, for instance one, two, three, five or more.

Each drainage channel 121 has a substantially orthogonal section and shares at least one side with an adjacent drainage channel 121. In this way, the drainage component 120, comprising four drainage channels 121 in the embodiment of FIG. 1, has a substantially rectangular section with two parallel long sides and two parallel short sides. In correspondence of one long side of the drainage component 120 (the long side closer to the cavities 300, 300' in the configuration of FIG. 1), a projecting surface 111 is formed. The projecting surface 111 projects outward of the housing 1001 and forms a fixing component 110 for fastening a mounting bracket 200 onto the housing 1001 of the charging socket 1000. The projecting surface 111 shown in FIG. 1 is further supported by supporting ribs 112 which provides an increased robustness and mechanical stability to the fixing component 110. The projecting surface 111 may form a delimiting surface of the drainage component 120 and may also form a fixing portion 110 to be fixed to a mating fitting portion of a mounting bracket.

The charging socket 1000 thus comprises a dual-functional element 100 formed on a lower surface and comprising a fixing component 110 and a drainage component 120 that share a projecting surface 111, projecting downwards of the charging socket 1000. The dual-functional element 100 is thus partially formed inside the housing 1001 of the charging socket 1000 (since the drainage channels 121 are connected to the contact chambers inside the housing 1001) and is partially protruding from the housing 1001 (since the projecting surface 111 is projecting downwards of the charging socket 1000).

The drainage element 120 and the fixing element 110 are molded in a single piece. The dual-functional element 100 is a single molded piece which performs a double function, that is the draining function and the fixing function to a mounting bracket. The drainage component 120 and the fixing component 110 share a delimiting surface, so there is no need to separate them along the outer surface of the charging socket 1000 and the overall dimensions of the charging socket 1000 can be reduced. In this way, the overall dimensions of the charging socket 1000 are reduced and the molding process for producing the charging socket 1000 is simplified and sped up, and the amount of plastic required for producing the charging socket 100 is reduced. Therefore, time and production costs are reduced. Further, the distance between the side of the charging socket 1000 facing the vehicle and the side of the charging socket 1000 facing the charging plug can be reduced.

The projecting surface 111 is configured to be fitted on a mating fitting portion of a mounting bracket. The fixing component 110 including the projecting surface 111 may be simply molded and can be efficiently fitted on a mating fitting portion of a mounting bracket, to keep the housing 1001 of the charging socket 1000 and the mounting bracket in the assembled configuration. In another embodiment, the projecting surface 111 is configured to be inserted into a fixing opening of the mounting bracket. This projecting surface 111 may be simply molded and can be efficiently inserted into a corresponding fixing opening of a mounting bracket, in order to keep the housing 1001 of the charging socket 1000 and the mounting bracket in the assembled configuration.

In the present disclosure, it is understood that orientation is defined by the force of gravity and that the terms "upper", "lower", "upwards", "downwards", etc. are defined in accordance thereto. In fact, it is clear that the fluids flow within the drainage channels 121 and come out of the drainage component 120 because of the gravity force. The charging socket 1000 may be arranged in the hybrid or electrical vehicle so that it is orientated in an oblique manner towards the rear; therefore, fluids flow within the drainage channels 121 which are angled towards the rear of the vehicle. Therefore, the drainage component 120 is located on the lower surface of the charging socket 1000 to let fluids come out of the charging socket 1000.

As can be seen in FIG. 1, in the assembly plate 1002, securing openings 1003 are further provided, through which the charging socket 1000 can be connected to the vehicle chassis by rivets or screws.

Figure 2:
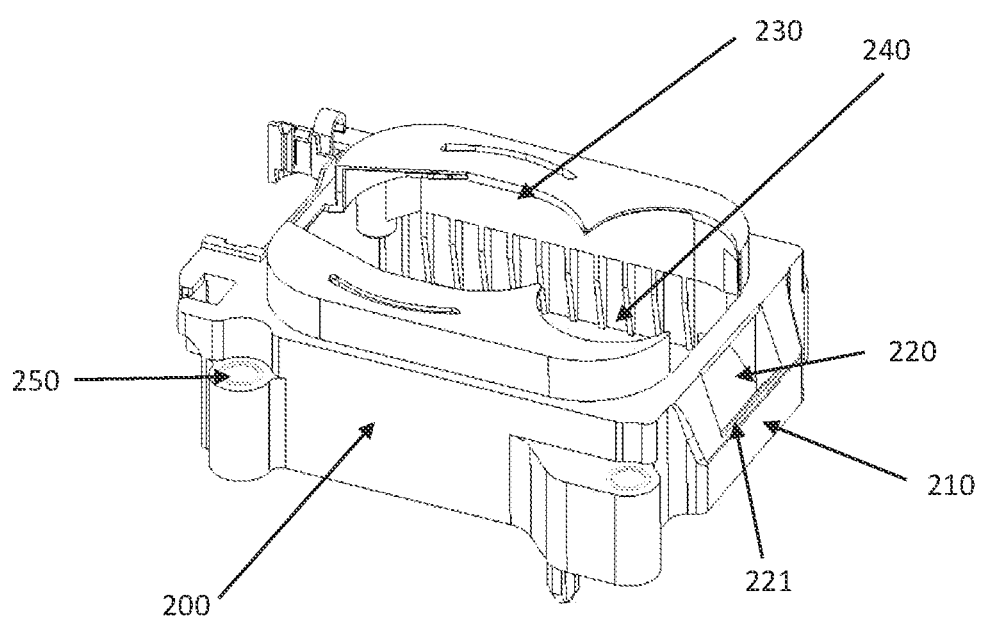
FIG. 2 is a perspective view of a bracket according to an embodiment.

FIG. 2 schematically illustrates a perspective view of a bracket 200 to be mounted on the charging socket 1000, according to an embodiment of the present invention. The mounting bracket 200 comprises a receiving portion 240 mating the shape of the housing 1001 of the charging socket 1000, which is configured for accommodating the electrically insulated housing 1001 and for protecting it from direct exposure to external elements such as moisture, water or dust. The mounting bracket 200 further comprises a main inlet opening 230 for receiving the electrical contacts to be inserted into the cavities 300, 300' of the electrically insulated housing 1001.

One of the external surfaces of the bracket 200 includes a fixing opening 220 having a fitting portion 221 to be engaged with the fixing component 110 of the charging bracket 200, in order to maintain the bracket 200 and the housing 1001 in the correct reciprocal position. In this way, the reciprocal position between the charging socket housing 1001 and the bracket 200 is fixed and maintained during operation. In fact, the charging socket 1000 is exposed to mechanical vibration during usage and it is thus necessary that the bracket 200 is reliably fixed and mounted onto the electrically insulating housing 1001 of the charging socket 1000.

The external surface of the bracket 200 including the fixing opening 220 further comprises a protective portion 210 in correspondence of the drainage component 120, so as to prevent external objects, such as dust or water, from entering the drainage channels 121. The protective portion 210 may be flat.

The protective portion 210 offers a specific and complete protection for the drainage component 120 and it prevents external elements from entering into the housing 101 and damaging it, while still allowing the stream of water coming out of the charging socket 1000 through the drainage component 120. Moreover, the advantage of this configuration is that it is not necessary to use a protective cap to cover the drainage channels 121, as done in prior art, because the drainage component 120 is directly covered by the mounting bracket.

The bracket 200 may further include securing portions 250 for receiving rivets or screws for connecting the bracket 200 to the vehicle chassis. The assembling process of the mounting bracket on the charging socket housing 102 is both simplified and sped up. In fact, the projecting surface 111 is easy to handle for the user, because it is separated from the vehicle chassis on which the charging socket 1000 is mounted.

Figure 3:
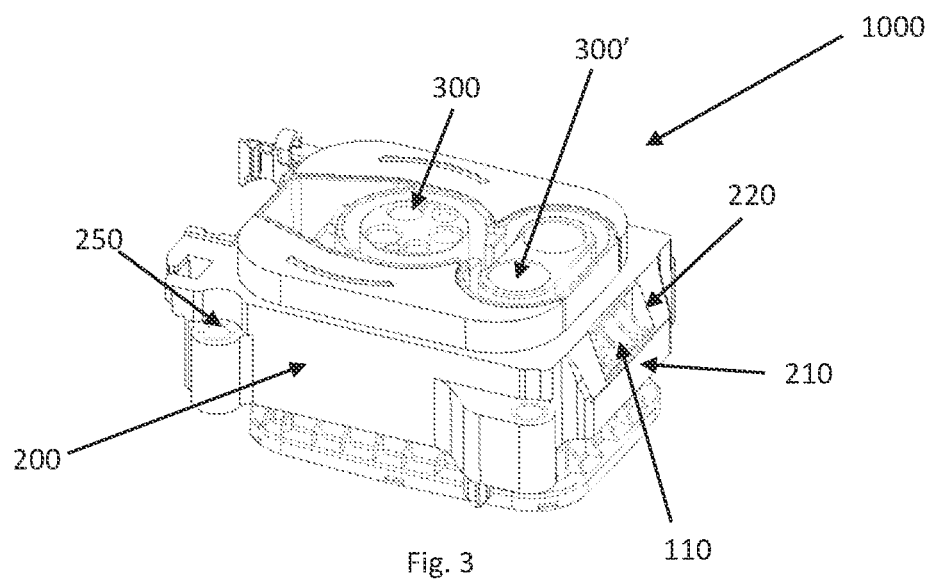
FIG. 3 is a perspective view of the charging socket with the bracket.

The electrically insulated housing 1001 is inserted into the receiving portion 240 of the mounting bracket 200 so that the inlet opening 230 is aligned with the cavities 300, 300' and the fixing opening 220 is placed in correspondence with the fixing component 110 of the charging socket 1000. FIG. 3 schematically illustrates a perspective view of a charging socket 1000 further comprising the mounting bracket 200, according to an embodiment of the present invention. The cavities for electrical contacts are not covered by the bracket 200 and the electrical contacts can be easily inserted therein.

The bracket 200 may be assembled to the housing 1001 for different purposes; for example, the housing 1001 may be fixed to the car chassis through the bracket 200 and the bracket 200 can hold the courtesy lights whose LEDs are located into housing 1001. Moreover, the bracket 200 may be used to protect the housing 1001 against external elements, since, as can be seen in FIG. 3, the protective portion 210 covers the drainage component 120 of the charging socket 1000, when the bracket 200 is mounted thereto. The bracket 200 may protect the housing 1001 against external elements, while still allowing the stream of water through the drainage channels 121, since the drainage channels 121 are not obstructed by the bracket 200 mounted onto the housing 1001 (see FIG. 3 and also FIG. 4).

The mechanical fitting of the bracket 200 and the electrically insulated housing 1001 is schematically illustrated in the sectional view of the charging socket 1000 according to the present invention in FIG. 4.

After that the electrically insulated housing 1001 has been inserted into the receiving portion 240 of the mounting bracket 200, the projecting surface 111 of the fixing component 110 is inserted into the fixing opening 220 and fitted on the fitting portion 221 of the bracket 200, which supports and holds it, so as to maintain the housing 1001 and the bracket 200 in the correct reciprocal position. In an embodiment, the fixing opening 220 may be bigger than the fixing component 110, so that the fixing component 110 is inserted thereto and is then held by a support portion of the fixing opening 220. In another embodiment, the fixing opening 220 may have such dimensions as to allow a precise fitting of the fixing component 110, in order to assure an even better fastening of the bracket 20 to the charging socket housing 1001.

In an embodiment, the bracket 200 is assembled to the charging socket housing 1001 by pivotally mounting it around the projecting surface 111. In an embodiment, when the bracket 200 and the housing 1001 are assembled, the projecting surface 111 of the fixing component 110 may abut on a mating fitting portion 221 of the bracket 200 and, in this way, the bracket 200 may be securely fastened to charging socket housing 1001.

Figure 5:
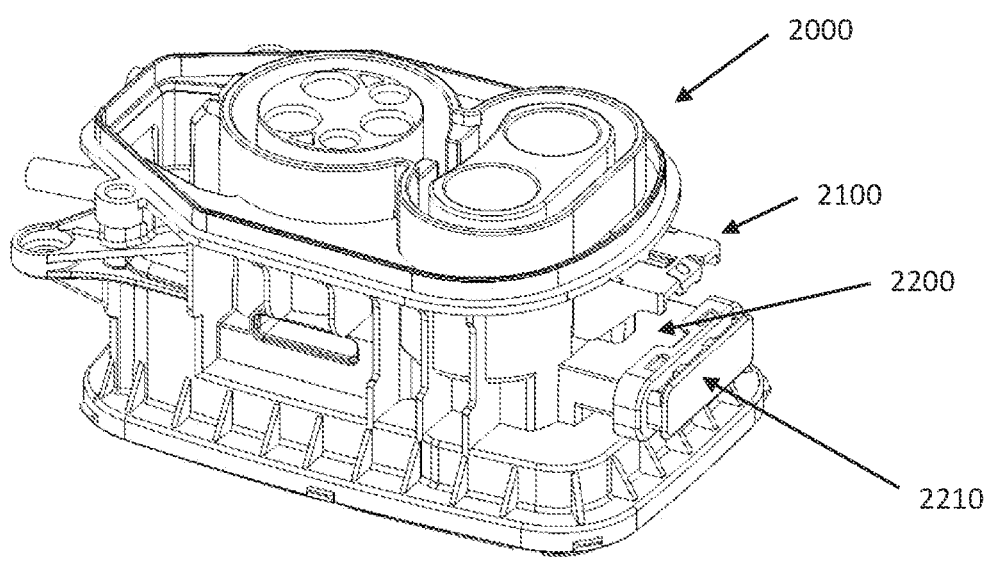
FIG. 5 is a perspective view of a charging socket according to the prior art.

In FIG. 5 a perspective view of a charging socket 2000 according to prior art is schematically illustrated, for comparison. The charging socket 2000 according to prior art comprises a fixing element 2100 for fixing it to a mounting bracket 200 and drainage element 2200, which are molded as two distinct components. Therefore, the molding process is more difficult and requires a larger amount of plastic, thus increasing production times and costs. Moreover, a protective cap 2210 is necessary for covering the drainage element 2200 and for preventing external elements to enter into the drainage channels.

While the invention has been described with respect to physical embodiments constructed in accordance therewith, it will be apparent to those skilled in the art that various modifications, variations and improvements of the present invention may be made in the light of the above teachings and within the purview of the appended claims without departing from the spirit and intended scope of the invention.

For instance, even if a charging socket for an electric or hybrid vehicle has been described, it is clear that the solutions according to the invention may also be used for other plug type connectors in which adequate air and creep current resistance and removal of water even in moist- or salt-containing atmospheres have to be ensured.

In addition, those areas in which it is believed that those of ordinary skill in the art are familiar, have not been described herein in order not to unnecessarily obscure the invention described. Accordingly, it must be understood that the invention is not to be limited by the specific illustrative embodiments, but only by the scope of the appended claims.

What is claimed is:

1. A charging socket, comprising:
   a housing formed of an electrically insulating material;
   a cavity in the housing receiving an electrical contact; and
   a dual-functional element partially protruding from an outer surface of the housing, the dual-functional element has a fixing component and a drainage component, the fixing component protrudes from the housing and fixes the housing to a mounting bracket, the drainage component has a drainage channel within the housing discharging fluids from the charging socket.

2. The charging socket of claim 1, wherein the fixing component has a projecting surface fitted on a mating fitting portion of the mounting bracket.

3. The charging socket of claim 1, wherein the fixing component has a projecting surface inserted into a fixing opening of the mounting bracket.

4. The charging socket of claim 1, wherein the drainage channel is one of at least a pair of drainage channels of the drainage component that are adjacent to one another.

5. The charging socket of claim 4, wherein the drainage component has a rectangular section with a pair of long sides and a pair of short sides.

6. The charging socket of claim 5, wherein the fixing component has a projecting surface projecting outwards from one of the long sides.

7. The charging socket of claim 6, wherein the projecting surface projects from the one of the long sides that is closer to the cavity.

8. The charging socket of claim 1, further comprising a bracket mounted on the housing.

9. The charging socket of claim 8, wherein the bracket has a fitting portion on which the fixing component is fitted to fasten the bracket to the housing.

10. The charging socket of claim 8, wherein the bracket has a fixing opening into which the fixing component is inserted to fasten the bracket to the housing.

11. The charging socket of claim 8, wherein the bracket has a flat protective portion that covers the drainage component when the bracket is mounted on the housing.

12. The charging socket of claim 11, wherein the flat protective portion prevents external objects from entering the housing.

13. The charging socket of claim 8, wherein the bracket has an inlet opening corresponding with the cavity.

14. The charging socket of claim 13, wherein the electrical contact is inserted into the cavity through the inlet opening.

15. A vehicle, comprising:
a charging socket including a housing formed of an electrically insulating material, a cavity in the housing receiving an electrical contact, and a dual-functional element partially protruding from an outer surface of the housing, the dual-functional element has a fixing component and a drainage component, the fixing component protrudes from the housing and fixes the housing to a mounting bracket, the drainage component has a drainage channel within the housing discharging fluids from the charging socket.

16. The vehicle of claim 15, wherein the charging socket is mounted on a chassis of the vehicle.

* * * * *